United States Patent [19]

Benford

[11] Patent Number: 4,834,395
[45] Date of Patent: May 30, 1989

[54] GASKET SEAL

[76] Inventor: Edward J. Benford, 5 The Dene, Hastings, East Sussex TN35 4PD, England

[21] Appl. No.: 122,911

[22] Filed: Nov. 19, 1987

[30] Foreign Application Priority Data

Nov. 21, 1986 [GB] United Kingdom ............... 8627911

[51] Int. Cl.⁴ .................... F16J 15/34; E21D 11/08; B29C 51/10
[52] U.S. Cl. .................................. 277/95; 405/153; 264/46.8
[58] Field of Search .......... 277/1, 12, 92, 95, DIG. 6; 52/245, 584; 29/283; 405/153, 151, 56; 264/48, 46.5

[56] References Cited

U.S. PATENT DOCUMENTS

| 3,161,436 | 12/1964 | Hood | 264/46.8 X |
| 3,695,044 | 10/1972 | Hoshino et al. | 405/153 X |
| 3,879,505 | 4/1975 | Boutillier et al. | 264/48 |
| 4,661,391 | 4/1987 | Schröder et al. | 264/46.8 X |

Primary Examiner—Donald A. Griffin
Attorney, Agent, or Firm—McAulay Fisher Nissen & Goldberg

[57] ABSTRACT

An arcuate concrete section (13) for forming a tunnel has a groove (12) around its edges for accommodating a rectangular frame sealing ring (11) of moulded rubber for sealing adjacent sections (13) together. The sealing ring (11) has a section (FIG. 3) with holes (20, 21, and 22) and grooves (23) for allowing distortion as the concrete sections are forced together edge to edge. At the corner of the sealing ring the section is moulded solid (FIG. 6), but with larger grooves (34) to allow for distortion.

8 Claims, 3 Drawing Sheets

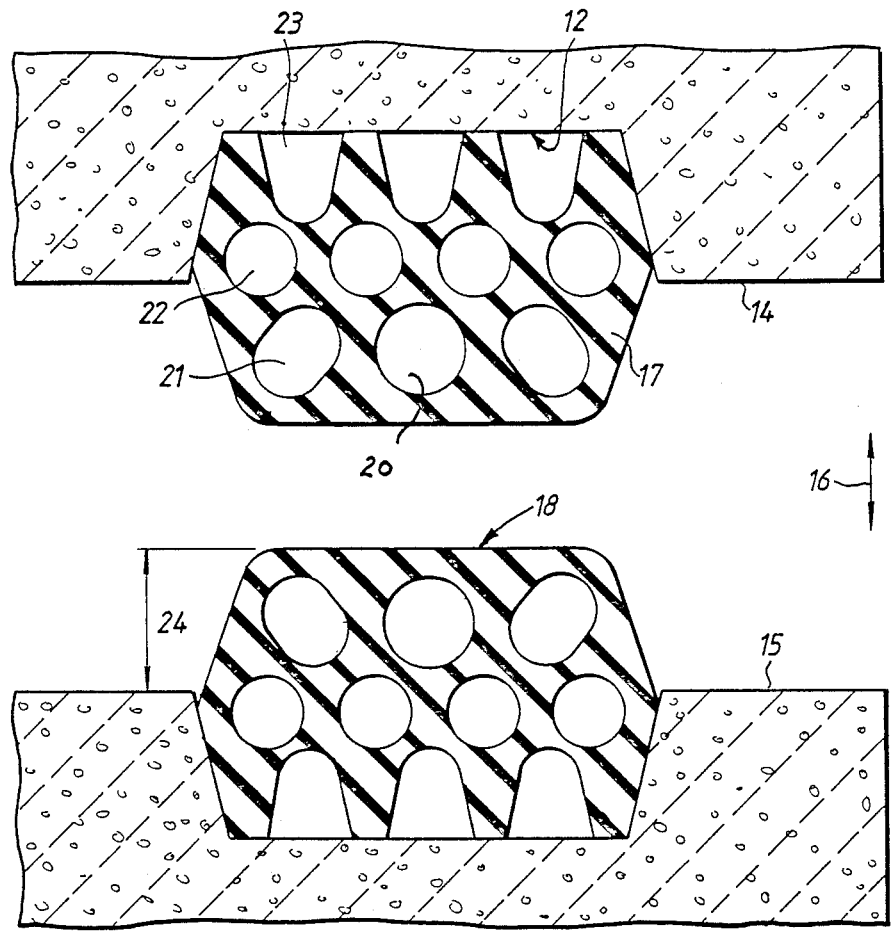
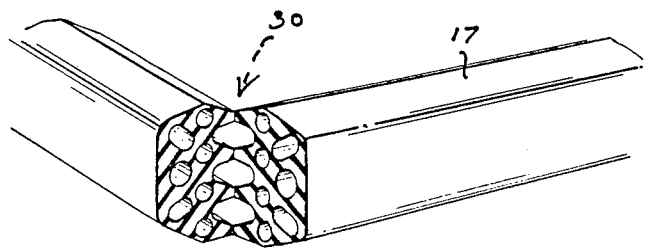
FIG. 3.
FIG. 4.

ial compression could be achieved.

GASKET SEAL

This invention relates to gasket seals of the kind which can be fitted in a groove in a surface of a member to be sealed to another member, so that when the two members are forced together, the gasket seal is compressed in the groove and a seal is achieved.

In general, the greater the pressure difference that has to be maintained across the seal, the larger will the seal section be and the greater must be the permissibility of compression of the seal member.

One example of such a seal is disclosed in British Patent Application No. 2170561 A, published 6 August 1986.

Where the components to be sealed are of rectangular shape, or indeed, of any non-circular shape, the gasket seal is likely to have to be formed with angles. For example, for sealing an arcuate segment of tunnel lining, the gasket will need to be generally in the form of a rectangle somewhat like a picture frame, but that raises the difficulty of forming the corners of such a frame. The sides can be formed with uniform cross-section so as to be capable of compressing as required, but a uniform section is not possible at corners.

According to the present invention, a gasket seal in the form of a frame of elastomeric material with elongate sides joined by moulded corners has sides with a cross-section with holes for permitting compression of the section, but at the moulded corners compression is permitted by virtue of large grooves moulded in the face of the corner material.

One method of forming the gasket frame is to fit the ends of two joining sides into a mould which defines a cavity for material to be moulded to form the corner and to be made integral with the ends of the straight sides. It is not easy to mould the corner material to have holes permitting compression, and in general, in the past, the moulded corner pieces have been too solid to have sufficient compressibility for effecting a proper seal.

According to an aspect of the present invention, the mould has a component defining substantial grooves or the like in the inner face of the corner material so that, in fact, there will not be excessive rubber in the cross-section of the moulded corner in spite of the fact that the corner is moulded without internal holes.

There may be an abrupt change of section where the straight side is joined to the moulded corner.

Also, during moulding, the amount of rubber or like elastomeric material injected into the mould to form the corner may be strictly controlled so that, although that material is effectively vulcanised and bonded to the ends of the straight sides, it does not flow to a great extent into holes in the cross-section of the straight sides.

The material for the corner portions may, in fact, be of a softer rubber than the material of the straight sides.

The invention includes a tunnel or pipe, of which the lining is built up of a number of pre-formed arcuate sections, which are sealed together by seals running round each section and compressed together in the assembly of the sections. The invention includes the sections fitted with the seals for forming the tunnel.

The invention may be carried into practice in various ways, and certain embodiments will now be described by way of example with reference to the accompanying drawings, in which:

FIG. 3 is a detailed section through the seals of two adjacent sections before they are forced together;

FIG. 4 is a sketch showing how two lengths of sealing strip are to be joined at the corners to form a frame seal of the kind shown in FIG. 2;

Figure 1:
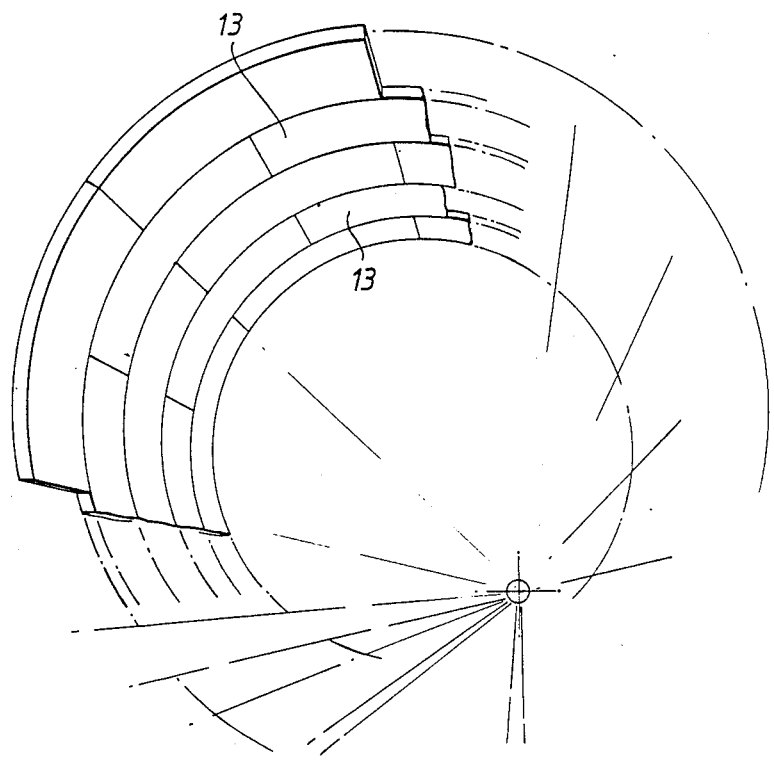
FIG. 1 is a diagrammatic perspective view of a tunnel, of which the lining is built up from a number of arcuate sections.
Figure 2:
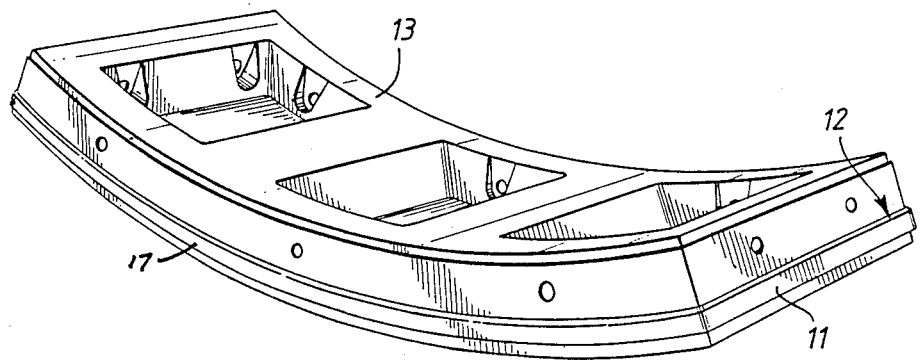
FIG. 2 is a perspective view of one of the tunnel lining section of FIG. 1 carrying a surrounding seal.

It is well known that a tunnel lining can be built up from a number of arcuate sections, such as that shown in FIG. 2, which may be of steel or cast iron, but are more usually of concrete.

In order to seal the sections together to keep the interior of the tunnel or pipe dry, a elastomeric sealing ring 11 is fitted into a groove 12 formed around the sides of the section shown generally at 13 in FIG. 2.

FIG. 3 shows two concrete sections 14 and 15, which are to be clamped together by movement towards each other as indicated by the arrow 16 with the intention being that there should finally be concrete-to-concrete contact. The sealing ring 11 consists of four long strips, each with a cross-section as shown at 17 in FIG. 3, which are joined together at their corners 30 in a manner to be described below, so that they could be considered to be in the form of a picture frame. When the sections 14 and 15 are clamped together, the rubber or other elastomeric material of the seals is compressed so that the rubber is forced both against the sides of the groove 12, in which it is fitted, and against the opposite face 18 of the seal it is in contact with.

The section 17 in FIG. 3 is shown as having two rows of holes 21 and 22, and a row of three grooves 23 in the face which will sit in the bottom of the groove 12. The presence of these holes and grooves allows the rubber to deform as the seal is compressed, so that concrete-to-concrete contact can be achieved, and the rubber can flow into the spaces defined by the openings 21, 22 and 23.

Due to the necessary manufacturing tolerances, and due to the fact that the axis of the tunnel is not mathematically straight, but tends to wander up and down and from side to side, in dependence on the ground in which it is lying, and the practical problems of assembling the components, and accordingly, there will be places where, although where two sections come together, they may be in concrete-to-concrete contact at one point, there may also be a gap of perhaps up to 15 mm between the two concrete sections at another point. In the example being described, the rubber section protrudes from the face of the concrete 15 by a distance 24 in FIG. 3 of 9 mm so that, even at a point where the concrete sections 14 and 15 were spaced apart in the direction of the arrow 16 by 15 mm, the two mating rubber seals 11 would still be compressed towards the faces of the concrete sections by distances to $(2 \times 9) - 15$ or 3 mm. If full concrete-to-concrete contact had been achieved, the amount of compression would have been $2 \times 9 = 18$ mm, and it is a requirement that, even if the amount of compression is only 3 mm, an effective seal against a specified pressure difference across the seal should be achieved. The other requirement is that, if full concrete-to-concrete contact is achieved, the rubber must be able to flow sufficiently for the seal to be packed into the groove 12.

Along the lengths of the seal 11, these conditions can be satisfied by the design of section shown at 17 in FIG. 3. This design is for a tunnel of 4.11 m internal diameter, where the maximum gap between the concrete of adjacent sections was 15 mm, and a seal against a pressure difference of 7 bars was, in fact, achieved. The total width of the sealing section was 38 mm and the total depth, 24 mm, but the two rows of holes 21 and 22 formed throughout the section and the row of three open grooves 23 allowed the rubber to flow sufficiently to achieve that result.

However, the seal can be used for any internal diameter of tunnel where there is a requirement to seal gaps between the concrete of adjacent sections up to 15 mm, with a pressure difference of up to 7 bars. If smaller gaps are required, the seal will withstand higher pressures; in fact, the seal has been tested at a 6 mm gap and withstood 25 bar pressure.

Figure 5:
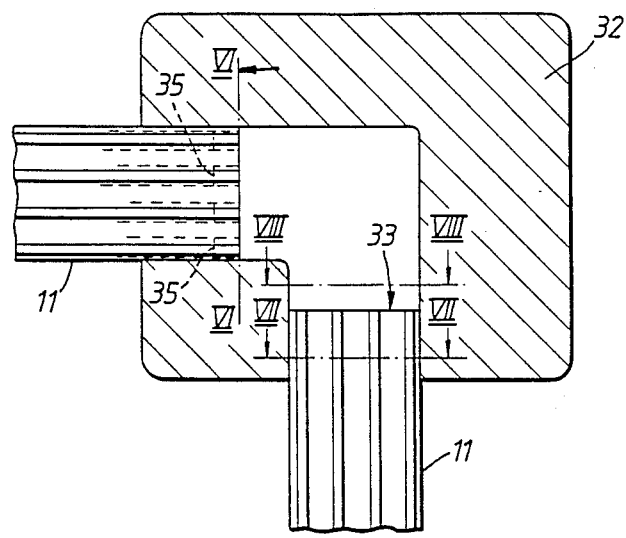
FIG. 5 is a diagrammatic view showing how the corner material is moulded to the two strips of FIG. 4.

In forming the rubber sealing frame 11, two lengths of the uniform section seal are brought together generally at right angles, as shown in FIG. 4, and in more detail, in FIG. 5, where the sections are indicated at 11. A mould shown only diagrammatically in FIG. 5 at 32, defines, with the ends 33 of the seal length 11, a cavity of generally right-angled shape, as seen in FIG. 5. Molten rubber is injected into that cavity, and vulcanises and becomes bonded to the rubber lengths 11 leading out of the mould cavity.

It is not possible to mould holes, such as the holes 21 and 22 by that method, although grooves such as the grooves 23, can be formed by closing the face of the mould by an appropriately shaped mould member. The vulcanised moulded rubber at the corners is solid and tends to flow into the holes in the adjacent lengths 11, so much so that, if precautions are not taken, the corners of the frame cannot be compressed enough to permit the two concrete sections to come into contact concrete-to-concrete, because there is nowhere for the corner rubber to flow.

Figure 6:
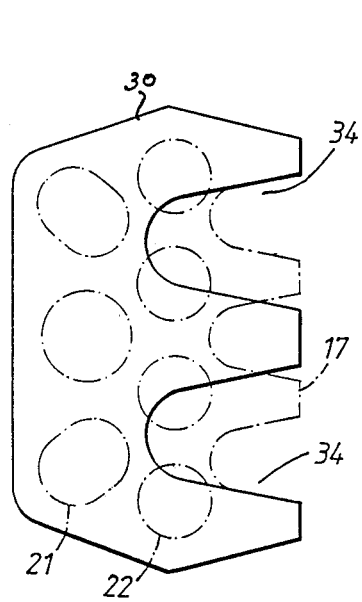
FIG. 6 is a section to an increased scale on the lines VI—VI in FIG. 5 showing the section of the moulded corner rubber and also showing, in dashed lines, its relationship to the section of the strips in FIG. 3.

Accordingly, the mould is closed by a mould component, which defines, in the inner face of the moulded rubber, which is the face seen in the direction of the arrow in FIG. 6, two wide and deep grooves 34. The size of those grooves can be contrasted with that of the grooves 23 in the section 17 of FIG. 3 of the lengths of the side of the seal frame, because the section 17 has been superimposed in FIG. 6 on the corner section, as indicated in chain lines. It will be seen that, although injected rubber, of which the amount injected is carefully controlled, may flow into the row of holes 21 in the adjacent section for a short distance, as indicated at 35 in FIG. 5, it is unlikely to flow fully into the holes in the row 22, so that the frame size will still be capable of compression, whereas the moulded rubber at the corners will also be capable of sufficient compression, because of the very large grooves 34 left in the inner face.

A frame in which the sides have the section 17 and the corners have the section of FIG. 6 with the grooves 34 can, in fact, be compressed enough to permit full concrete-to-concrete contact on either side.

In the example being described with reference to FIG. 2, one concrete section is 8 inches (203 mm) thick, is 2.5 m long around the arc, and 1 m wide, and the depth of the groove 12 is 15 mm with a width tapering from 40 mm down to 34 mm at the bottom of the groove.

This type of seal will close down concrete-to-concrete with a relatively low load. In fact, the concrete segments can be closed together purely by the torque that can be exerted by the bolts and require no further mechanical assistance by hydraulics or air, as is required by other designs of gasket.

Figure 7:
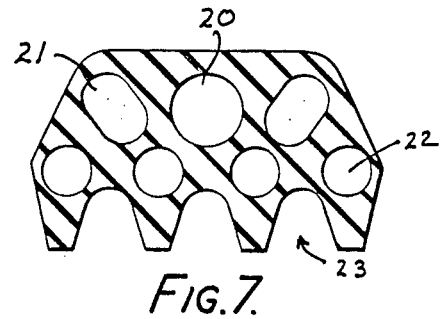
FIGS. 7 and 8 are views corresponding to FIGS. 3 and 6 of a smaller seal.
Figure 8:
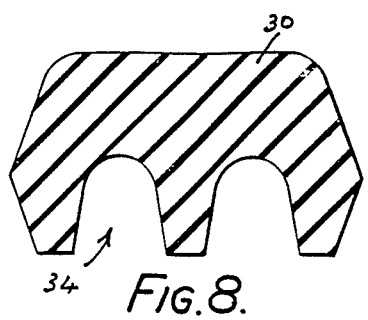

An alternative design shown in FIGS. 7 and 8 is for sealing concrete sections having grooves 10 mm deep, 30 mm wide at the top, and 26 mm wide at the bottom. It is designed to seal gaps between concrete sections of up to 10 mm, at which it will withstand pressures up to 4 bars. The design shows how sealing up or down can be performed to suit different gap and/or pressure requirements.

As with the design of FIG. 3, the outer holes 21 in the outer row are oval rather than having the circular shape of the other holes. The oval shape increases the rigidity of the section at the corners for approximately the same cross-section as a circular hole such as the centre hole 20 of the outer now. This tends to cause initial deformation of the section as the concrete sections are brought together, to be at the centre rather than at the corners of the seals.

FIG. 8 shows the section of the moulded rubber at the corner (line VIII in FIG. 5) where there are no internal holes.

What I claim is:

1. A gasket seal in the form of a frame of elastomeric material having elongate sides joined by moulded corners, the sides having a cross-section with holes for permitting compression of the section, and the moulded corners being solid, but having grooves moulded in the surface of the material for permitting compression.

2. A seal as claimed in claim 1 in which the material of the corner portions is of a rubber which is softer than the material of the elongate sides.

3. A seal as claimed in claim 1 or claim 2 in which the holes for permitting compression of the section of the elongate sides are in rows, and in which the outermost row has outer holes of oval shape and at least one inner hole of circular shape.

4. A seal as claimed in claim 1 in which the elongate sides have a cross-section with grooves in addition to the holes, which grooves are of less total area than the grooves in the surface of the corner material.

5. A seal as claimed in claim 1 in which there is an abrupt change of section where an elongate side is joined to a moulded corner.

6. An arcuate section for forming, with other sections, a tunnel, including a groove around the edges of the section, and a gasket seal fitted in the groove, the seal being in the form of a frame of elastomeric material having elongate sides joined by moulded corners, the sides having a cross-section with holes for permitting compression of the section, and the moulded corners being solid, but having grooves moulded in the surface of the material for permitting compression.

7. A tunnel built up from arcuate sections sealed together by gasket seals, each seal being fitted in a groove formed around the edges of a section, and being in the form of a frame of elastomeric material having elongate sides joined by moulded corners, the sides having a cross-section with holes for permitting compression of the section, and the moulded corners being solid, but having grooves moulded in the surface of the material for permitting compression.

8. A method of making a gasket seal in the shape of a frame with elongate sides joined at the corners, in which the ends of two adjoining sides of elastomeric material are fitted into a mould and then additional elastomeric material for forming a corner is introduced into the mould and made integral with the said ends of the frame sides, in which the corner is of solid section, but has surface grooves defined by the shape of the mould.

* * * * *